United States Patent [19]
Gurr

[11] Patent Number: 5,294,078
[45] Date of Patent: Mar. 15, 1994

[54] INTEGRATED SYSTEM AND METHOD FOR ASSEMBLING, AND THEN TRANSPORTING AND SUPPORTING A LAUNCH VEHICLE

[76] Inventor: John W. Gurr, P.O. Box 291056, Port Orange, Fla. 32129

[21] Appl. No.: 909,966

[22] Filed: Jul. 7, 1992

[51] Int. Cl.⁵ .............................................. B64F 1/04
[52] U.S. Cl. ..................................... 244/116; 244/63; 244/158 R
[58] Field of Search .................. 244/63, 158 R, 116; 89/1.8, 1.801, 1.802, 1.805, 1.815

[56] References Cited

U.S. PATENT DOCUMENTS

| | | | |
|---|---|---|---|
| 2,882,795 | 4/1959 | Bergner et al. | 89/1.8 |
| 2,968,410 | 1/1961 | Hamilton et al. | 89/1.805 |
| 3,044,362 | 7/1962 | Carlberg | 89/1.7 |
| 3,044,363 | 7/1962 | Musser | 89/8 |
| 3,044,364 | 7/1962 | Reepmeyer | 89/27 |
| 3,160,289 | 12/1964 | Leefer | 89/1.805 |
| 3,228,294 | 1/1966 | Hickman | 89/1.8 |
| 3,284,888 | 11/1966 | McClain et al. | 89/1.805 |
| 3,399,460 | 12/1976 | Skliris | 89/1.803 |
| 3,526,166 | 9/1970 | Pfister | 89/1.802 |
| 3,601,000 | 8/1971 | Schneider | 89/1.801 |
| 4,141,277 | 2/1979 | Bouillon | 89/38 |
| 4,363,257 | 12/1982 | Harris et al. | 89/1.802 |
| 4,409,880 | 10/1983 | Fetterly | 89/1.804 |
| 4,475,436 | 10/1984 | Campbell | 89/1.804 |
| 4,711,151 | 12/1987 | Griffin et al. | 89/1.805 |
| 4,739,691 | 4/1988 | Beutler et al. | 89/1.801 |
| 4,771,998 | 9/1988 | Rogge et al. | 269/17 |
| 4,856,409 | 8/1989 | Bowden | 89/1.819 |
| 4,916,999 | 4/1990 | Palmer et al. | 89/1.815 |
| 4,932,607 | 6/1990 | Layton et al. | 244/63 |
| 4,934,241 | 6/1990 | Piesik | 89/1.817 |
| 5,042,358 | 8/1991 | Kuriiwa | 89/1.8 |

OTHER PUBLICATIONS

Martin Marietta, *Titan III Commercial Launch Services*, Apr. 1987, pp. 1-14.

*Primary Examiner*—Michael S. Huppert
*Assistant Examiner*—Anne E. Bidwell

[57] ABSTRACT

The system includes an assembly building of sufficient dimension to permit a launch vehicle to be vertically integrated within the building, and to simultaneously receive a combination launch pedestal-lift and transport unit within the building. The launch vehicle is vertically integrated within the building upon the pedestal, and then transported to the launch pad where the vertical height of the lift and transport unit is reduced, leaving the launch pedestal and vehicle in place at the launch pad. Various other features facilitate low cost launch programs using the system and method.

45 Claims, 7 Drawing Sheets

INTEGRATED SYSTEM AND METHOD FOR ASSEMBLING, AND THEN TRANSPORTING AND SUPPORTING A LAUNCH VEHICLE

BACKGROUND OF THE INVENTION

The present invention relates generally to systems and methods for launching spacecraft, and in particular to systems and methods for integrating the assembly, transportation and support of launch vehicles.

A number of systems and methods have been employed in the past for first conducting the assembly of spacecraft and launch vehicles,, then transporting the launch vehicle to a launch pad, and thereafter providing necessary support and testing before launch. In one arrangement utilized with the National Aeronautics and Space Administration's Saturn and Space Shuttle Programs, the launch vehicle is integrated vertically within the interior of a Vertical Assembly Building (VAB), and then moved to the launch site on a mobile transport unit, while the launch vehicle and spacecraft are positioned vertically upon the transport unit.

A mobile build up, transport and support system is disclosed in U.S. Pat. No. 4,771,998 to Rogge et al. In U.S. Pat. No. 4,363,257, Harris et al disclose a service assembly for a vertical launch system.

In the early days of the space and defense missile program, a variety of assemblies and facilities for launching and servicing spacecraft were used, including mechanical lay down towers and rail mounted launch towers. Assembly, transport and support systems which were relatively simple and economical in design were replaced by mobile service towers weighing several thousand tons, massive umbilical towers and large water cooled flame buckets contained within specialized concrete structures. The launch facilities presently used by NASA at the Kennedy Space Center are multi-functional, automated and sophisticated, but represent replacement costs in excess of two billion dollars. There is a need for an integrated system and method for assembling launch vehicles, and then for the rapid transport of the launch vehicle and payload to a clean, uncomplicated launch pad where launch support can be completed and the vehicle launched with a minimum of expense.

SUMMARY OF THE INVENTION

The system and method of the present invention has as its objectives means for permitting a launch vehicle and pay load to be vertically integrated directly upon the structure that will serve as the launch pedestal and platform, with the launch pedestal and platform being supported during the vertical integration phase by a mobile lift and transport unit. The launch pedestal assembly includes means for supporting the launch vehicle in a vertical position upon the platform, and interconnecting means for engagement with the lift and transport unit for lifting the entire weight of the launch platform and the launch vehicle vertically together. The lift and transport unit has corresponding means for engaging with the interconnecting means of the launch pedestal for vertically supporting the entire weight of the pedestal, launch vehicle and payload; in its preferred form, the lift and transport unit supports a vertical structure which is dimensioned to extend about the launch pedestal and launch vehicle and thereby provide access during the vertical integration of the various stages of the launch vehicle and payload.

In one form, the interconnecting means of the launch pedestal and the engaging means of the lift and transport unit comprise plural structural members extending generally horizontally from the launch pedestal, and plural corresponding horizontal support surfaces on the lift and transport unit, each of which is spaced and dimensioned to engage a corresponding structural member of the launch pedestal as the height of the lift and transport unit is adjusted vertically.

The vertical structure of the lift and transport unit includes a number of important features which facilitate the vertical integration of the launch vehicle and payload, the facile transport of the entire system to the launch pad and then continuing support of the launch vehicle as the lift and transport unit (and the related vertical structure) are moved away from the vehicle in preparation for launch. Among the features provided with the vertical structure are (a) means along the vertical structure for receiving elongated fuel and oxidizer transfer structures on opposing sides of the vertical structure, and removably coupling both the fuel and oxidizer transfer structures temporarily to the vertical structure during a fueling operation conducted at the launch pad; (b) plural horizontal platforms spaced vertically along the structure, each of which can be rotated away from the launch vehicle after placement at the launch pad; (c) a structural framework which is dimensioned to fit through an ingress-egress opening of the associated vertical assembly building; and (d) elevation means for permitting worker access to the various stages during vertical integration.

The vertical assembly building useful with the system and method of the present invention has dimensions sufficient to house the integrated launch pedestal-launch vehicle-lift and transport unit combination within the building, and having an ingress-egress opening dimensioned to permit the lift and transport unit with its associated vertical structure to move out of the building. The assembly building is spaced a distance from the associated launch site, and in one form, a number of Vertical Assembly Buildings support a single launch pad. A launch pad roadway is provided between the Vertical Assembly Building and the launch pad, and is sufficiently load-bearing to carry the combined weight of the lift and transport unit with its vertical structure, together with the launch pedestal and a vehicle mounted vertically upon the launch pedestal. Significantly, means are provided with the launch and transport unit-vertical structure combination for maintaining an umbilical cable connection as the lift and transport unit moves along the launch site roadway toward the launch pad, so that launch vehicle checks made through the umbilical cable at the assembly building need not be repeated at the launch pad. An appropriate storage trench or other appropriate means is placed along the roadway for storing the umbilical cable coupled between the lift and transport unit and the launch pedestal after the launch pedestal is appropriately placed at the launch pad, and before launch. Thus, the launch pad itself is free of complex structures built within the launch pad. Rather, a flame deflector (if needed) is provided at the base of the launch pedestal, thereby avoiding the need for a built-in flame deflector in the launch pad.

The launch pad is provided with anchors which receive the vertical risers of the launch pedestal assembly.

Similarly, anchors across the foundation of the vertical assembly building are mated with and support a freestanding crane located within the assembly building, the crane defining an internal bay of sufficient dimension to receive the lift and transport unit and its associated vertical structure.

These and other important features of the present invention will be understood with reference to the accompanying drawing, and the following detailed description.

In the various views of the drawing, two digit reference numerals are used to indicate major assemblies of the system, and three digit numbers are used to indicate specific elements associated with each assembly. The three digit reference numbers use the same first digit as the associated major assembly; for example, vertical assembly building 20 (a major assembly) includes structural framework 212, building skin 216 and doors 218 as elements of that major assembly.

DETAILED DESCRIPTION

The following contains an overall description of the major components of the system of the present invention, and is followed by a detailed description of each major assembly and the manner in which these individual assemblies interrelate together.

A. Principal Components of the System

Figures 1, 3, 4, 5:
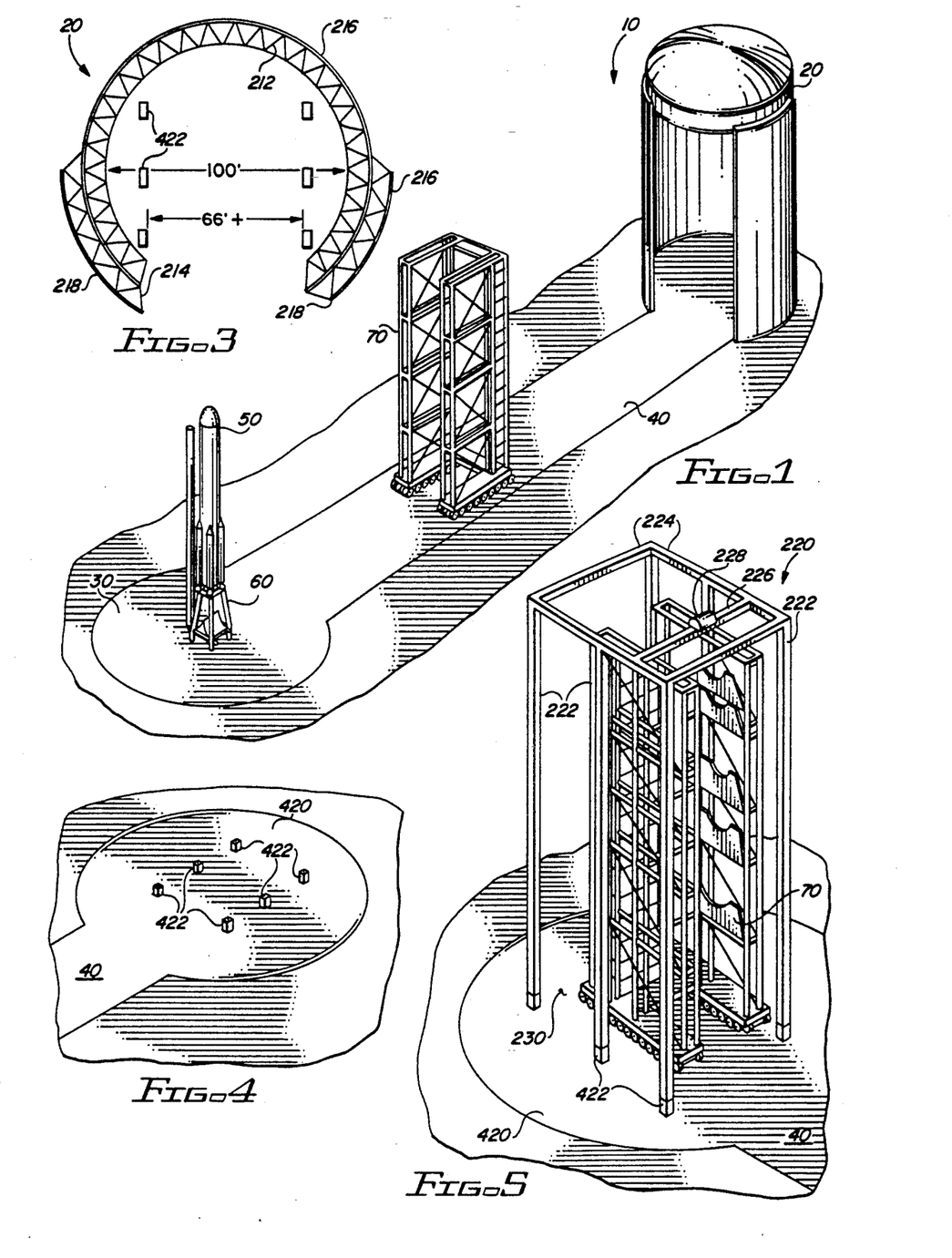
FIG. 1 is a perspective view illustrating the principal elements of the launch access, transportation and support system of the present invention.
FIG. 3 is a cross section of the building construction shown in FIG. 2, taken along the line 3—3.
FIG. 4 is a perspective view illustrating the foundation of the assembly building shown in FIGS. 2 and 3.
FIG. 5 is a perspective view illustrating the freestanding crane mounted upon the foundation shown in FIG. 4, and within the assembly building depicted in FIGS. 2 and 3; the lift and transport unit and its associated vertical structure is also depicted in FIG. 5, illustrating the manner in which that assembly is received within the bay of the free-standing crane.
Figure 2:
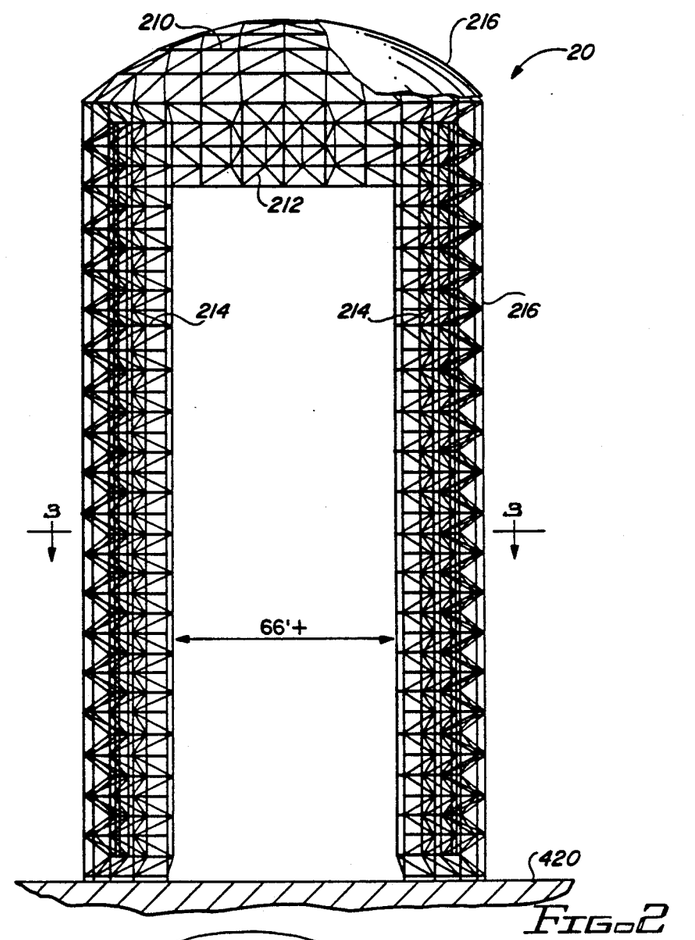
FIG. 2 is a front elevation of a vertical assembly building useful with the system of the present invention, with a portion of the outer skin of the building cut away for illustration purposes.

Referring first to FIG. 1, the system of the present invention, referred to generally by the reference numeral 10, includes a vertical assembly building 20, a launch pad 30 spaced some distance away from the building 20 and with a load-bearing roadway 40 between the building 20 and the launch pad 30. The system 10 has as its principal purpose the vertical integration of a launch vehicle 50, and then the transporting of the vehicle to the launch pad 30, and for thereafter supporting the vehicle during the launch phase. To this end, there is provided a launch pedestal 60 upon which the vehicle 50 is initially vertically integrated within the building 20 while positioned within the vertical structure of a lift and transport unit 70 in a manner described in greater detail below.

B. Vehicle Assembly Building and Free-Standing Crane Structure

Reference is now made to FIGS. 2-5. The vertical assembly building 20 is positioned on a foundation 420 having fixed anchors 422 for supporting a free-standing crane structure 220 (note FIGS. 4 and 5). The building 20 includes a vertical structural framework 212 and a ceiling framework 210, all of which is covered with a skin 216. The building 20 defines an ingress-egress opening 214 and a pair of doors 218 which permit the opening 214 to be closed.

As shown in FIG. 5, the free-standing crane 220 includes a plurality of vertical supports 222 connected to the anchors 422, the crane 220 further including horizontal supports 224, and a movable horizontal rail 226 with an overhead hoist 228. The crane 220 defines a central bay 230 of sufficient dimension to permit the lift and transport unit 70 and its associated vertical structure (described in greater detail below) to fit within the bay 230.

It will thus be understood from a review of FIGS. 2-5 that the launch vehicle So is initially vertically integrated within the building 20 while positioned inside the bay 230 of the free-standing crane 220, and further included within the vertical structure of the lift and transport unit 70.

C. Roadway and Launch Pad

Figure 6:
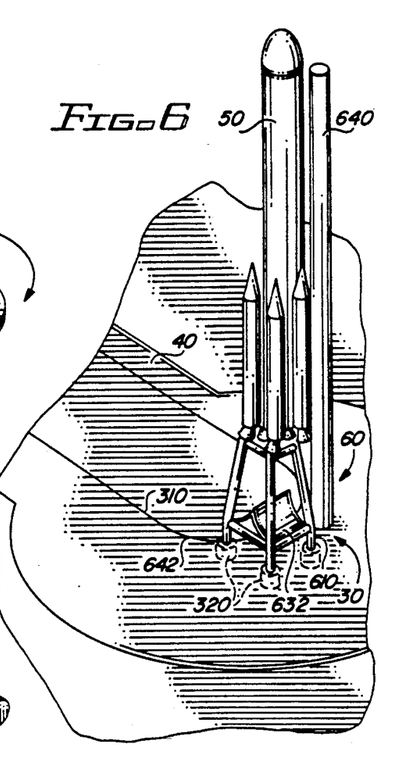
FIG. 6 is a perspective view illustrating a roadway and launch pad.

Referring to FIGS. 1 and 6, the roadway 40 between the assembly building 20 and the launch pad 30 is sufficiently load-bearing to carry the combined weight of the lift and transport unit together with its vertical structure, a launch pedestal (described in greater detail below with reference to FIGS. 7 and 8), and the launch vehicle mounted vertically upon the launch pedestal. As shown in FIG. 6, a portion of the roadway 40 includes a recess 310 for receiving an umbilical cable 642 for coupling between the lift and transport unit 70 and the launch vehicle 50.

The launch pad 30 includes plural below-ground anchors 320 for receiving the ground support legs of the launch pedestal 60; otherwise, the surface of the launch pad 30 is free of any fixed flame deflector structure, as the flame deflector is integrated with the launch pedestal, as described next.

D. Portable Launch Pedestal, Umbilical Tower and Deflector Structure

Figure 7:
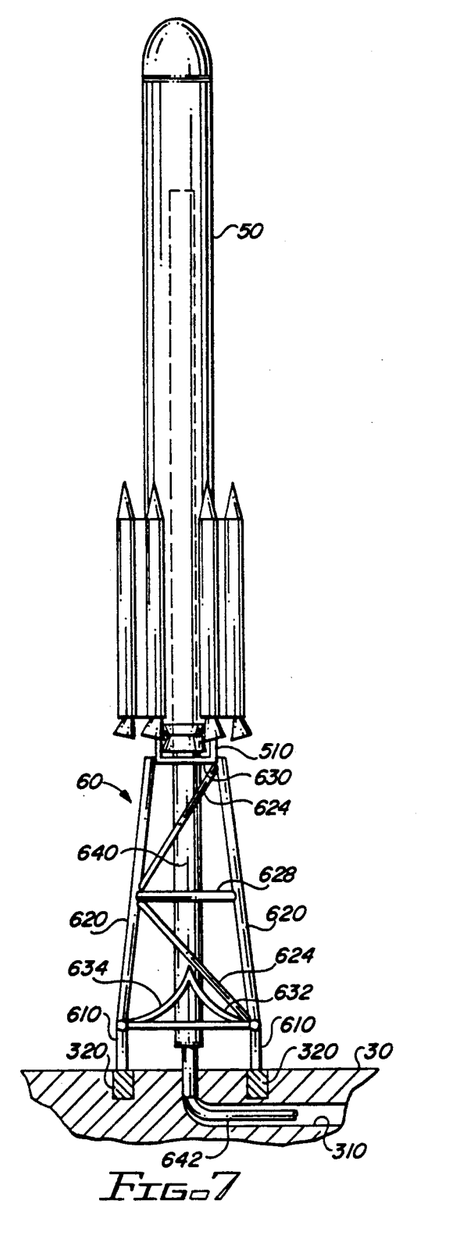
FIGS. 7 and 8 are front and side views, respectively, illustrating the launch pedestal assembly of the present invention as mounted at the launch pad, and with the launch vehicle mounted upon the pedestal assembly.
Figure 8:
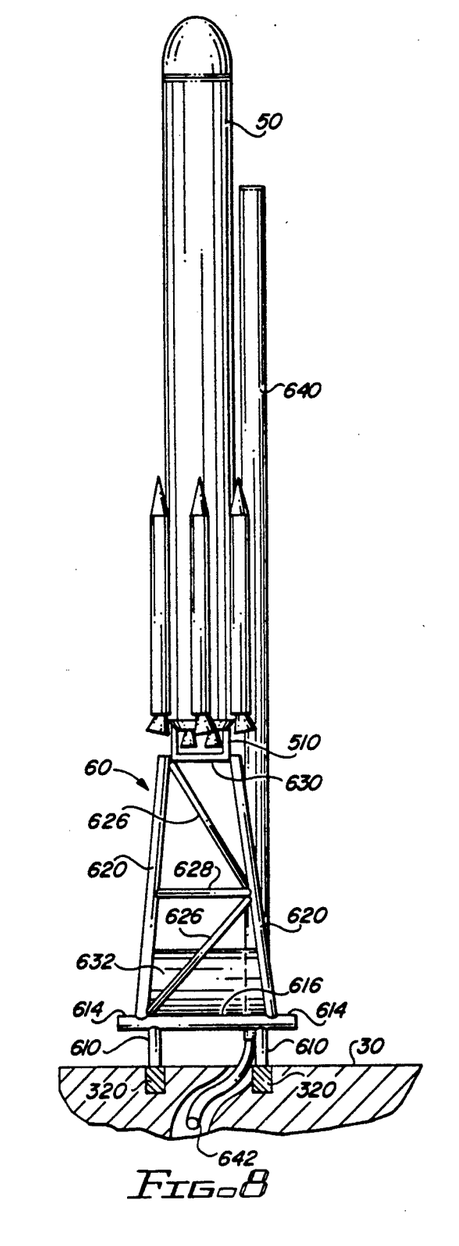

Reference is now made to FIG. 7 and 8. The launch pedestal 60 includes plural ground support legs 610 which are dimensioned to fit with the anchors 320 on the launch pad 30. The ground support legs 610 are coupled with horizontal supports 616, each of which has an extension portion 614 which permits the interconnection and engagement with the lift and transport unit 70, for lifting the pedestal 60 and the associated launch vehicle 50 vertically together, as is described below in greater detail with reference to FIGS. 9-12.

A flame deflector 632 is positioned across the horizontal support 616, and a launch platform 630 is supported by the pedestal 60 above the flame deflector 632 by vertical supports 620, horizontal supports 628 and struts 6241 626. The launch platform 630 is dimensioned for interconnection with a launch mount 510, which accompanies the booster section of the launch vehicle and does not form a part of this invention.

E. Lift and Transport Unit, and Associated Vertical Structure

Details of the lift and transport unit 70 and its associated vertical structure will now be described with reference to FIGS. 9-14.

The lift and transport unit 70 includes a horizontal platform 710 and associated load-bearing wheels 712. The platform 710 may be assembled from commercially available heavy load transport systems which may be integrated together. Suitable heavy load transport systems are manufactured by the Scheuerle Company of Pfedelbach, Germany. The transport units which form the base of the lift and transport unit 70 have the platform 710 fabricated across the multiple transport units in a generally U-configuration, so that a vertical structure is supported upon the platform 710, described below. Each load-bearing wheel 712 is supported by the platform 710 by a hydraulic unit 714, each of which includes a pair of brackets 715, 716 which are pivoted together at 713 and actuated by a hydraulic cylinder 718 (see FIGS. 13 and 14).

The lift and transport unit 70 further includes a vertical structure defined by vertical supports 720, cross members 722 and horizontal supports 724 which are constructed so as to define a central bay 726. The central bay 726 has a generally U-shaped configuration along its length, and is dimensioned so as to receive both the launch pedestal 60 and the integrated launch vehicle 50 supported upon the pedestal.

The lift and transport unit 70 further includes plural platforms spaced along the bay 726, each platform defined by two plates 728, 730 which are rotatably fixed along a corresponding vertical support 720, and have a shape which permits the plates to extend generally horizontally about the umbilical tower 640 and the launch vehicle 50. (See FIG. 11). The platforms 728, 730 permit personnel to work upon the various stages of the launch vehicle, including its upper pay load.

Figure 10:
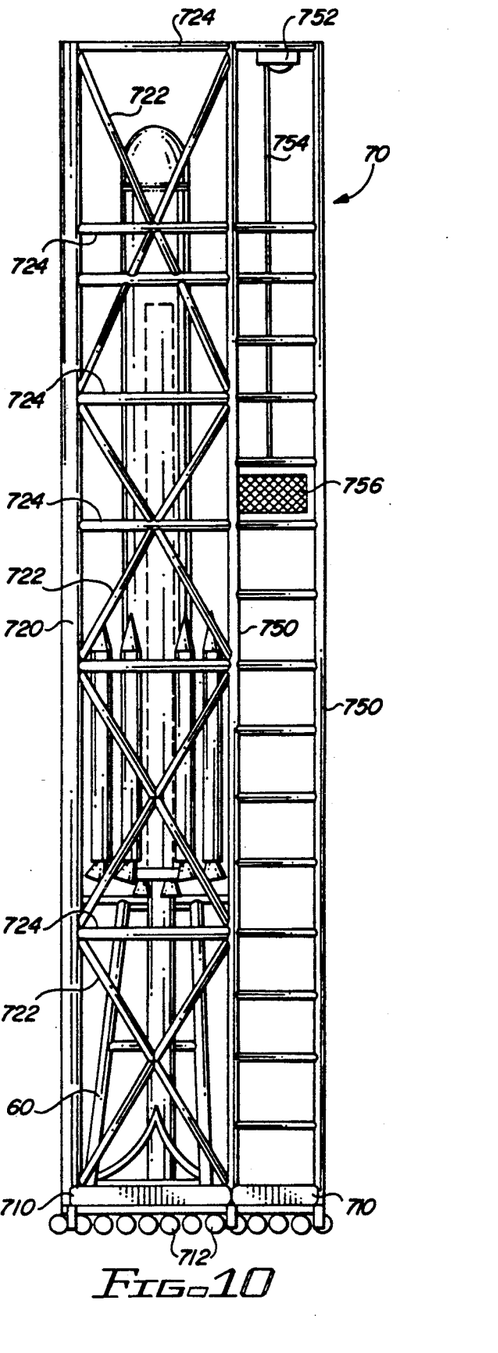
Figure 11:
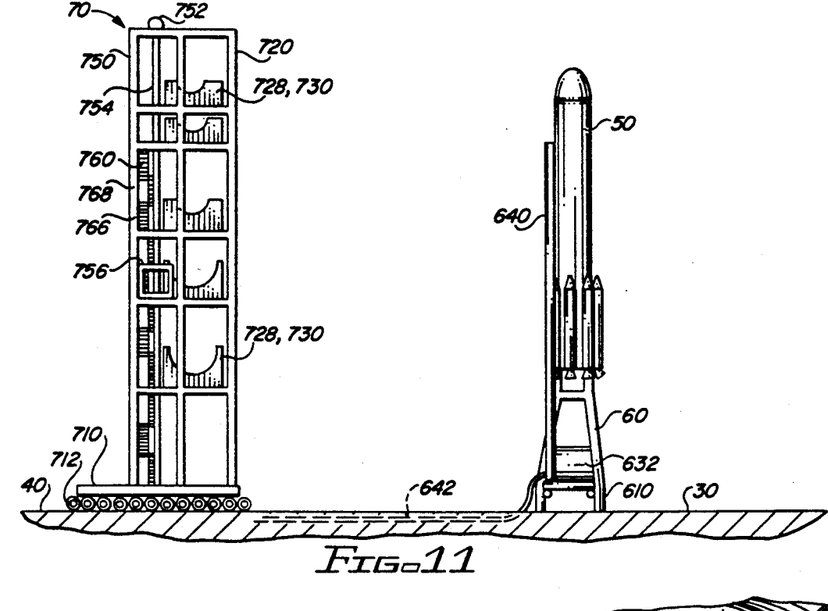
FIG. 11 is a perspective view illustrating the lift and transport unit together with its vertical structure after the pedestal-launch vehicle combination has been properly placed at the launch pad.

As shown in FIGS. 10 and 11, the lift and transport unit 70 also includes a vertical service structure defined by ancillary vertical supports 750 having an overhead elevator motor 752, elevator cable 754 and elevator 756 supported therein, together with stairs 760, all of which permit access by appropriate personnel to the various stages of the launch vehicle 50.

Figure 9:
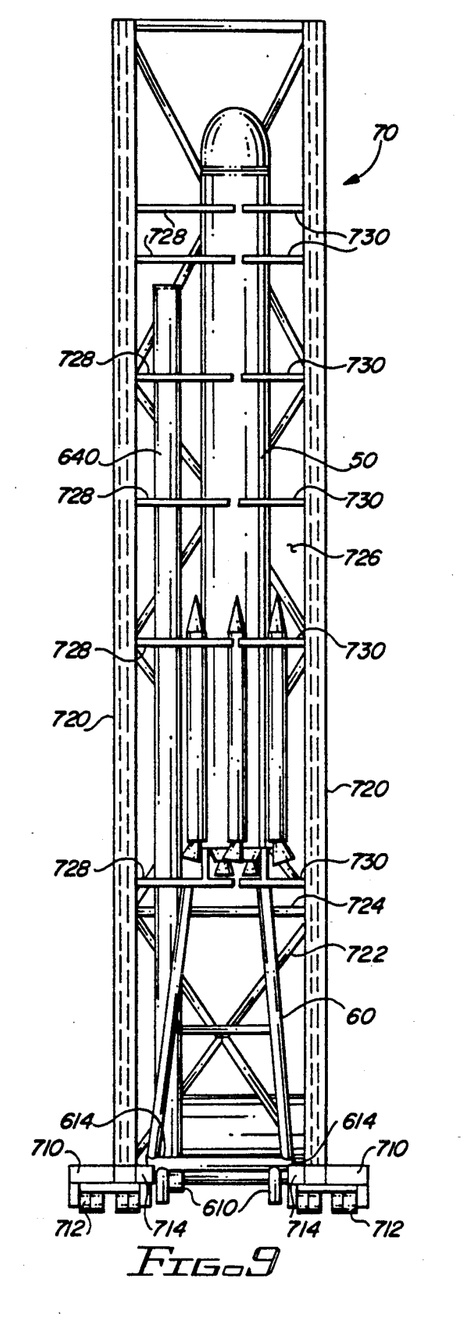
FIGS. 9 and 10 are front and side elevations, respectively, illustrating the integrated launch pedestal and lift and transport unit combination.
Figures 12, 15:
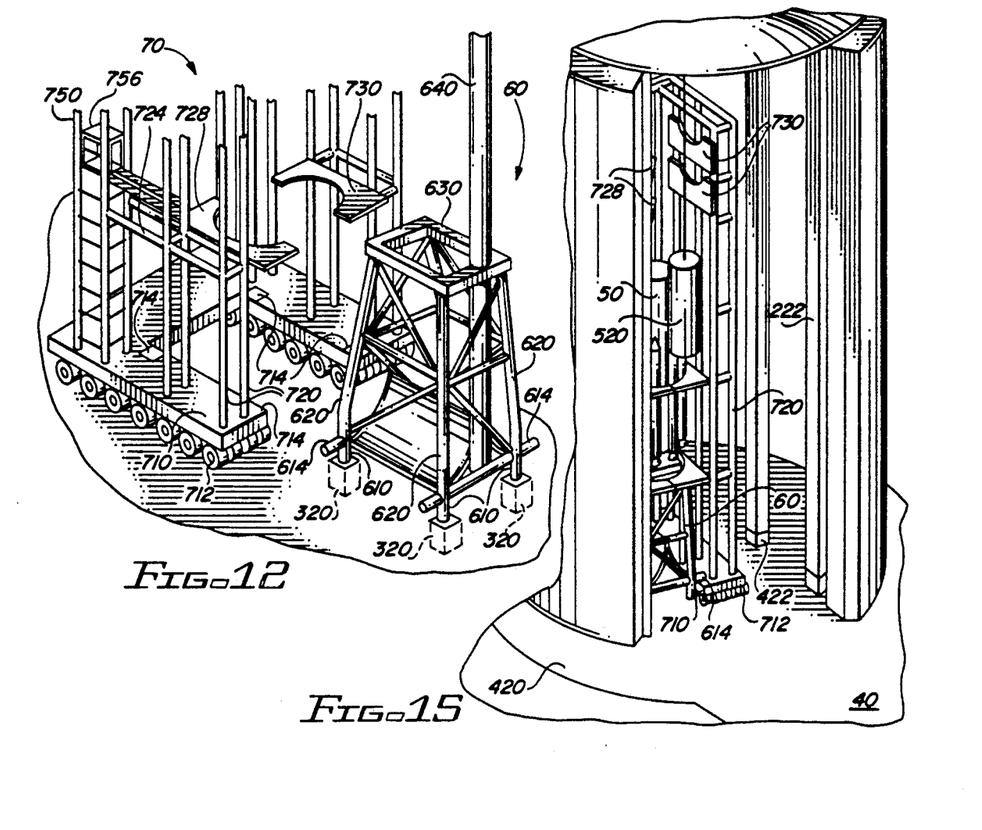
FIG. 12 is a perspective view of a portion of the launch pedestal and lift and transport unit assemblies.
FIG. 15 is a perspective view showing the manner in which the lift and transport unit and the pedestal are positioned within the bay of the crane during the vertical integration phase.
Figure 13:
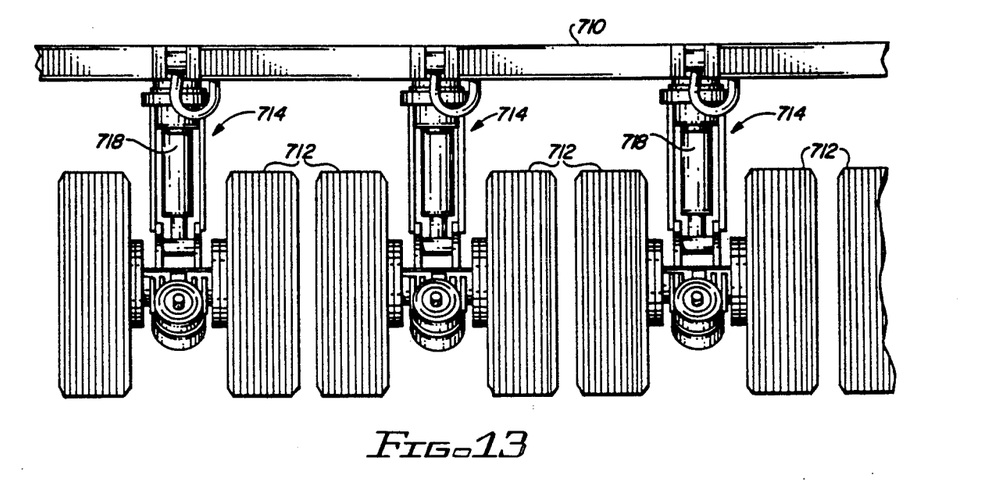
FIGS. 13 and 14 are perspective views illustrating details of the unit of FIGS. 9-12.
Figure 14:
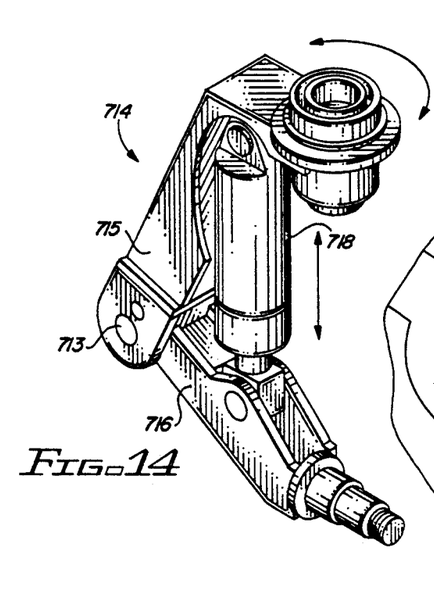

As is specifically shown in FIGS. 9 and 12, the lift and transport unit 70 includes horizontal support surfaces 714 which are adapted to engage the horizontal extensions 614 of the pedestal 60 by operation of the hydraulic elevation mechanism described above and shown in FIGS. 13 and 14, which permit the entire platform 710 to be either reduced in height, or elevated. Thus, the platform 710 is reduced in elevation (without the pedestal 60 within the bay 726), and the unit 70 is then moved forward so that the extensions 614 are positioned over the support surfaces 714. Thereafter, the hydraulic means with the unit 70 are actuated to lift the entire platform 710, and at the same time elevate the pedestal 60. The entire assembly of the pedestal 60 may then be moved as required, e.g., moved into the assembly building 20, for vertical integration of a launch vehicle 50 upon the pedestal 60; or, alternatively, if the launch vehicle 50 has already been assembled upon the pedestal 60, then the entire combination may be moved to the launch pad 30 for launch operations.

An important aspect of the present invention is the ability to conduct tests through the umbilical cable 642 while connected to the launch vehicle 50 in the assembly building 20, and thereafter maintaining the connection of the umbilical cable to the launch vehicle 50 during transport to the launch site, and through the launch phase. This may be achieved with means with the unit 70 which handles excess portions of the umbilical cable 642 by storing that excess during the horizontal transport, and permitting the cable to be "played" through the handling means during movement between the assembly building 20 and the launch pad 30. Conventional cable reels at the back of the unit 70 are suitable for this purpose.

F. Portable Propellant Loading Assembly

Figures 16, 17, 18:
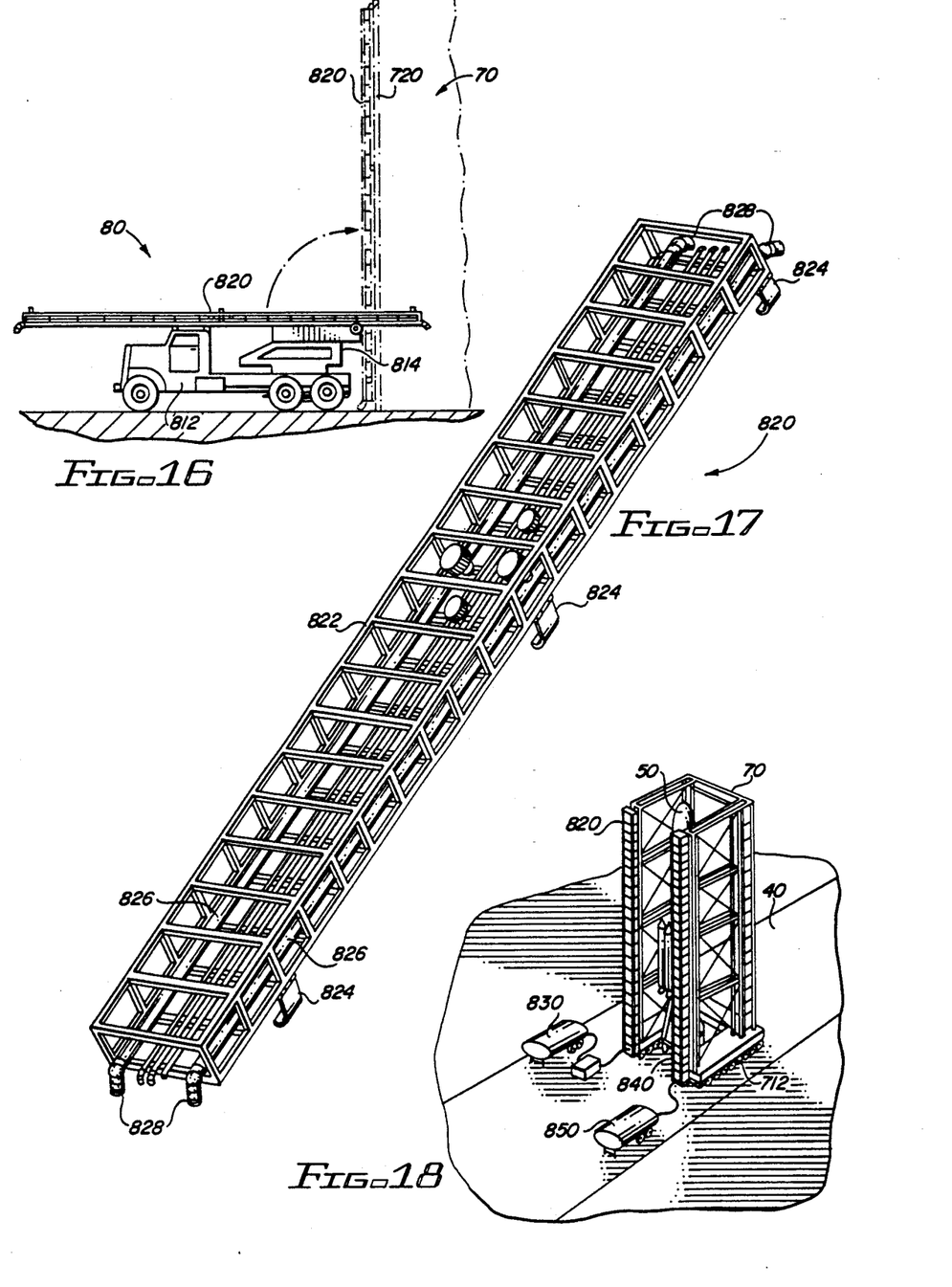
FIG. 16 is a side view of a fuel/oxidizer transfer structure.
FIG. 17 is a perspective view of a portion of the structure shown in FIG. 18.
FIG. 18 is a perspective view illustrating the manner in which the fuel and oxidizer transfer structures are used during a fueling procedure.

For safety reasons, it is customary to load the launch vehicle 50 with a fuel and an oxidizer away from the assembly building 20. In accordance with the present invention, this may be undertaken on the launch pad 30 at a time before launch. To this end, there is provided a portable propellant loading assembly referred to in FIGS. 6-18 by the reference numeral 80. The loading assembly 80 includes a prime mover 812 having a load bed 814 with a retractable propellant transfer structure 820 pivotally mounted on the bed 814. In use, the structure 820 is pivoted along one side of a vertical structure 720 associated with the unit 70, as shown in FIG. 18. As further depicted in FIG. 18, two of the units 80 may be utilized along opposing sides of the vertical structure of the unit 70, so that one structure 820 may be utilized for loading fuel from tanker 830, and a second transfer structure 840 positioned along a second side for loading oxidizer from a separate tanker 850.

As shown in FIG. 17, the transfer structure 820 includes elongated supports 822 and attachment legs 824 for facilitating joinder with the vertical support 720 of the unit 70. Fuel/oxidizer lines 826 extend through the structure 820, and include quick connect-disconnect couplers at either end.

G. Multiple Assembly Building Configuration

Figure 19:
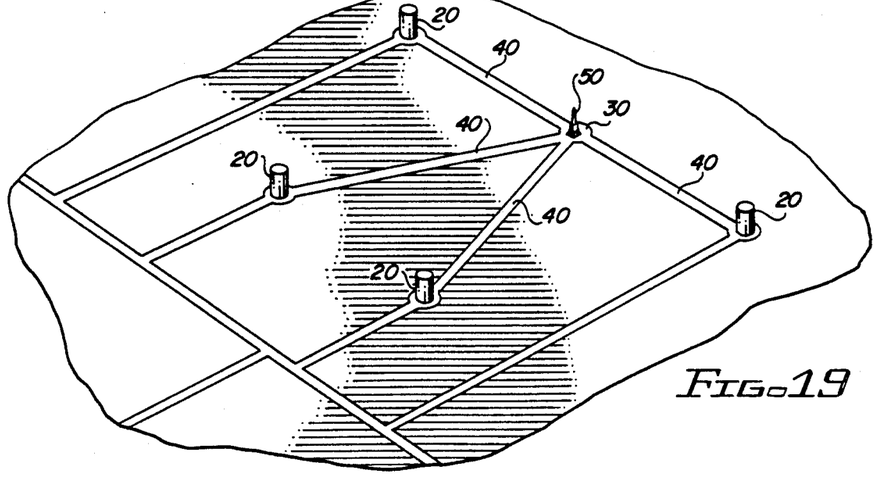
FIG. 19 is a perspective view illustrating a multiple vehicle assembly building layout for use with a single launch pad in accordance with the present invention.

The system 10 of the present invention particularly lends itself well to use in a multiple assembly building configuration of the type shown in FIG. 19. There, plural assembly buildings 20 are shown spaced around a single launch pad 30, with a separate roadway between each assembly 20 and the launch pad 30. The plurality of assembly buildings 20 may each be supported by a combined launch pedestal-lift unit combination 60, 70 or alternatively may be supported with only two or three of those combinations, thereby further reducing the expense associated with multiple, staggered launches from a single launch pad.

This concludes the description of the preferred embodiments. A reading by those skilled in the art will bring to mind various changes without departing from the spirit and scope of the invention. It is intended, however, that the invention only be limited by the following appended claims.

What is claimed is:

1. A system for providing access, transportation and support for a launch vehicle, comprising:
    a launch pedestal having:
        ground support means,
        a platform supported upon the ground support means,
        means for supporting the launch vehicle in a vertical position upon the platform, and
        interconnecting means for engagement with a lift and transport unit for lifting the platform and the launch vehicle vertically together; and
    a lift and transport unit having:
        means for engaging with the interconnecting means of the launch pedestal and for vertically supporting the entire weight of the pedestal and the launch vehicle;
        means for transporting the unit horizontally; and
        means for reducing the vertical height of the lift and transport unit, to permit the ground support means to thereafter support the combined weight of the launch pedestal and the launch vehicle.

2. The system recited in claim 1 wherein the launch pedestal further comprises a generally vertical umbilical tower for interconnecting control and power cables to the launch vehicle.

3. The system recited in claim 1 wherein the vertical height reducing means of the lift and transport unit comprises hydraulic actuation means.

4. The system recited in claim 1 wherein the interconnecting means of the launch pedestal and the engaging means of the lift and transport unit comprise:
    plural structural members extending generally horizontally from the launch pedestal; and
    plural horizontal support surfaces on the lift and transport unit each of which is spaced and dimensioned to engage a corresponding structural member of the launch pedestal as the height of the lift and transport unit is vertically reduced.

5. The system recited in claim 1 further comprising a vertical structure supported upon the lift and transport unit, the vertical structure dimensioned to extend about at least one side of the launch pedestal and the launch vehicle.

6. The system recited in claim 5 further comprising vertical elevation means carried by the vertical structure.

7. The system recited in claim 5 further comprising means along the vertical structure for handling excess cable.

8. The system recited in claim 7 wherein the excess cable handling means comprises a cable handling system.

9. The system recited in claim 5 further comprising:
    an elongated fuel transfer structure having transfer piping along its length;
    means for elevating the fuel transfer structure vertically along one side of the vertical structure; and
    means for removably coupling the fuel transfer structure with the one side of the vertical structure.

10. The system recited in claim 9 wherein the fuel transfer structure telescopes along its length.

11. The system recited in claim 9 further comprising:
    an elongated oxidizer transfer structure having transfer piping along its length;
    means for elevating the oxidizer transfer structure vertically along a second side of the vertical structure spaced from the one side; and
    means for removably coupling the oxidizer transfer structure with the second side of the vertical structure.

12. The system recited in claim 5 further comprising:
    plural horizontal platforms spaced vertically along the vertical structure; and
    means for rotating each platform into a vertical position against the vertical structure.

13. The system recited in claim 5 wherein the vertical structure is dimensioned to fit about three sides of the launch pedestal and the launch vehicle, the vertical support and the lift and transport unit defining a bay into which the launch pedestal and the launch vehicle are capable of fitting.

14. The system recited in claim 5 wherein the vertical structure comprises a tubular framework.

15. The system recited in claim 1 wherein the ground support means further comprises a flame deflector supported under the platform.

16. The system recited in claim 1 wherein the ground support means comprises a structural frame including plural vertical support legs.

17. The system recited in claim 16 wherein the interconnecting means comprises plural structural members extending horizontally from the structural frame.

18. The system recited in claim 5 further comprising a vertical assembly building having dimensions sufficient to house the launch pedestal and the launch vehicle in a vertical position upon the launch and transport unit with the vertical structure in place, the vertical assembly building having an ingress-egress opening dimensioned to permit the lift and transport unit to move out of the building carrying the launch pedestal and launch vehicle vertically supported along the vertical structure.

19. The system recited in claim 18 further comprising:
    a launch pad distant from the vertical assembly building;
    a launch pad roadway between the launch site and the vertical assembly building, the roadway being sufficiently load-bearing to carry the combined weight of the lift and transport unit, the vertical structure, the launch pedestal and a launch vehicle mounted vertically upon the launch pedestal; and
    means with the launch and transport unit-vertical structure combination for retaining an umbilical cable connection between the vertical assembly building and the launch vehicle as the lift and transport unit moves along the launch site roadway toward the launch site, whereby launch vehicle checks made through the umbilical cable at the assembly building need not be repeated at the launch site.

20. The system recited in claim 19 further comprising means along the roadway for storing an umbilical cable coupled to the launch vehicle during movement of the lift and transport unit along the roadway.

21. The system recited in claim 20 wherein the storing means comprises a recess along the roadway.

22. A system for the assembly, testing, transportation and launching of plural missiles, comprising:
 a launch site;
 plural missile assembly buildings spaced from the launch site, and each building having a central bay;
 a launch site roadway between each assembly building and the launch site, each roadway being sufficiently load-bearing to carry a combined weight of a lift and transport unit, a launch pedestal and a missile mounted vertically upon the launch pedestal;
 a combined launch support and transport assembly dimensioned to fit within the central bay of each assembly building, the launch support and transport assembly having: a base;
  a vertical structure fitted upon the base, the vertical structure having a recess for receiving a launch pedestal and a vertically-integrated missile,
  means for horizontally transporting the base, the vertical structure, the launch pedestal and the vertically-integrated missile, and
 a launch pedestal with means for removably coupling with the launch support and transport assembly, whereby a missile is vertically integrated upon the launch pedestal within an assembly building and within the vertical structure, and then the launch pedestal and missile are transported together along the roadway to the launch site while in the vertical position.

23. The system recited in claim 22 further comprising a free-standing crane fitted within each missile assembly building.

24. The system recited in claim 22 wherein the removable coupling means comprises means for raising and lowering one of the vertical structure and the launch pedestal, whereby they may be integrated together vertically while located in a missile assembly building, and thereafter decoupled from each other at the launch site so that the launch pedestal and missile stand alone at the launch site.

25. The system recited in claim 24 wherein the removable coupling means comprises:
 plural structural members extending generally horizontally from the launch pedestal; and
 plural horizontal support surfaces on the launch support and transport assembly, each of which is spaced and dimensioned to engage a corresponding structural member of the launch pedestal as the vertical dimension of the launch support and transport assembly is adjusted vertically.

26. A system for the assembly, transport and support for a missile, comprising:
 an assembly building having a vertical height sufficient to permit a missile to be vertically integrated within the building, the building having an ingress-egress opening sufficient to allow a transport unit with a vertical structure to pass therethrough;
 a transport unit having a vertical structure with a bay;
 a launch pedestal for supporting the missile during vertical integration, the pedestal removably supported by the transport unit in the bay of the vertical structure;
 a launch pad;
 a roadway between the assembly building and the launch pad, the roadway having a sufficient load-bearing capability to support the entire weight of the transport unit and its vertical structure, the launch pedestal and a missile integrated on the launch pedestal;
 an exhaust deflector; and
 means for supporting the exhaust deflector under the launch pedestal at the launch pad, without coupling the exhaust deflector to the launch pad.

27. The system recited in claim 26 further comprising means for movably coupling the pedestal within the bay of the vertical structure.

28. The system recited in claim 27 wherein the removable means comprises:
 plural structural members extending generally horizontally from the launch pedestal;
 plural horizontal support surfaces on the transport unit, each of which is spaced and dimensioned to engage a corresponding structural member of the launch pedestal; and
 means for vertically adjusting the height of the transport unit.

29. The system recited in claim 26 further comprising an umbilical tower fixed with the launch pedestal.

30. The system recited in claim 29 further comprising an umbilical cable carried by the transport unit and extending through the umbilical tower to the missile.

31. The system recited in claim 30 further comprising means with the transport unit for retaining an umbilical cable connection between the assembly building and the missile as the transport unit moves along the roadway toward the launch pad, whereby missile checks made through the umbilical cable at the assembly building need not be repeated at the launch pad.

32. A method for providing access, transportation and launch support to a launch vehicle, comprising the steps of:
 providing a lift and transport unit having a vertical support structure with a bay dimensioned to removably receive a launch pedestal and a vertically integrated launch vehicle supported upon the pedestal, the unit further including means for removably engaging, lifting and horizontally transporting the launch pedestal and launch vehicle combination together;
 vertically integrating the launch vehicle upon the launch pedestal while the pedestal is fitted within the bay of the lift and transport unit;
 horizontally transporting the lift and transport unit and the launch pedestal-launch vehicle combination together to a launch site; and thereafter
 removing the lift and transport unit so that the launch pedestal-launch vehicle combination rests at the launch site upon a ground support of the launch pedestal.

33. The method recited in claim 32 further comprising the step of fitting the launch pedestal with a flame deflector.

34. The method recited in claim 32 further comprising the steps of fitting the vertical structure with an excess cable handling means.

35. The method recited in claim 32 further comprising the step of extending an elongated fuel transfer structure alongside the vertical support structure and removably coupling the transfer structure along one side of the vertical structure.

36. The method recited in claim 35 further comprising the step of extending an elongated oxidizer transfer structure along a second side of the vertical structure, and removably coupling the oxidizer transfer structure to the second side of the vertical structure.

37. The method recited in claim 32 further comprising the steps of:
providing a vertical assembly building having dimensions sufficient to house the launch pedestal and the launch vehicle in a vertical position upon the launch and transport unit within the vertical structure;
fitting a launch site distant from the vertical assembly building;
installing a launch site roadway between the vertical assembly building and the launch site, the roadway being sufficiently load-bearing to carry a combined weight of the lift and transport unit when the launch pedestal, launch vehicle and vertical support structure are all integrated upon and carried by the lift and transport unit;
retaining an umbilical cable connection with the launch vehicle as the lift and transport unit moves along the roadway toward the launch site, whereby launch vehicle checks made through the umbilical cable at the assembly building need not be repeated at the launch site.

38. The method recited in claim 37 further comprising the step of storing an umbilical cable coupled between the vertical assembly building and the launch vehicle during movement of the lift and transfer unit along the roadway.

39. The method recited in claim 32 further comprising the steps of:
providing plural vertical assembly buildings each dimensioned sufficient to house the launch pedestal and the launch vehicle in a vertical position upon the launch and transport unit;
fitting a launch site distant from all of the vertical assembly buildings; and
installing launch site roadways between each vertical assembly building and the launch site, each roadway being sufficiently load-varying to carry a combined weight of the lift and transport unit when the launch pedestal, launch vehicle and vertical support structure are all integrated together and carried by the lift and transport unit.

40. The method recited in claim 32 further comprising the step of fitting an umbilical tower with the launch pedestal for movement with the launch pedestal during the horizontal transporting step.

41. The method recited in claim 40 further comprising the step of moving umbilical cables together with the lift and transport unit and the launch pedestal-launch vehicle combination during horizontal transporting step.

42. The method recited in claim 41 further comprising the step of retaining an umbilical cable connection with the launch vehicle during the horizontal transporting step.

43. The method recited in claim 32 further comprising the step of removably coupling a fuel transfer structure alongside the vertical structure.

44. The method recited in claim 43 further comprising the step of removably coupling an oxidizer transfer structure along a side of the vertical structure spaced from the fuel transfer structure.

45. The method recited in claim 32 further comprising the steps of:
fitting the vertical structure with plural horizontal platforms spaced vertically along the vertical structure; and
rotating each platform into a horizontal position during the vertical integrating step.

* * * * *